(12) United States Patent
Krelle (10) Patent No.: US 8,903,970 B2
(45) Date of Patent: Dec. 2, 2014

(54) EXPLICIT LOGGING OF NETWORK USER NODE/TARGET NODE COUPLING

(75) Inventor: Brian E. Krelle, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 680 days.

(21) Appl. No.: 12/061,222

(22) Filed: Apr. 2, 2008

(65) Prior Publication Data

US 2009/0252056 A1 Oct. 8, 2009

(51) Int. Cl.
*G06F 15/173* (2006.01)
*H04L 29/08* (2006.01)

(52) U.S. Cl.
CPC ............ *H04L 67/22* (2013.01); *H04L 67/2814* (2013.01)
USPC .......................................... 709/223; 709/227

(58) Field of Classification Search
CPC ......... H04L 67/10; H04L 67/14; H04L 67/22; H04W 40/248
USPC ................................................ 709/223, 227
See application file for complete search history.

(56) References Cited

U.S. PATENT DOCUMENTS

| | | | | |
|---|---|---|---|---|
| 6,657,965 B1 * | 12/2003 | Shaffer et al. | | 370/238 |
| 6,765,927 B1 * | 7/2004 | Martin et al. | | 370/469 |
| 7,193,968 B1 * | 3/2007 | Kapoor et al. | | 370/235 |
| 7,624,184 B1 * | 11/2009 | Aviani et al. | | 709/227 |
| 7,664,108 B2 * | 2/2010 | Bahattab | | 370/389 |
| 2002/0042840 A1 * | 4/2002 | Yamada | | 709/239 |
| 2006/0168316 A1 * | 7/2006 | Kabashima et al. | | 709/238 |
| 2008/0215723 A1 * | 9/2008 | Takeshima et al. | | 709/224 |

* cited by examiner

*Primary Examiner* — Duyen Doan (57) ABSTRACT

An Edge switch. The edge switch includes a first module configured to receive multiple coupling signals from at least one user node, a second module, and a log. For each coupling signal, the coupling signal indicates coupling one of the at least one user nodes to one of at least one target nodes via one of at least one proxy servers, the first module is configured to determine an identity of the one of the at least one user nodes and an identity of the one of the at least one target nodes from the coupling signal, and the second module is configured to record the identity of the one of the at least one user nodes, the identity of the one of the at least one target nodes, and date and time at which the coupling signal was processed by the edge switch in an entry in the log.

22 Claims, 7 Drawing Sheets

| DATE/TIME STAMP | USER NODE IDENTIFICATION | USER IDENTIFICATION | TARGET IDENTIFICATION |
|---|---|---|---|
| | | | |
| | | | |
| | | | |
| | | | |

FIG. 2C

| DATE/TIME STAMP | USER NODE IDENTIFICATION | USER IDENTIFICATION | TARGET IDENTIFICATION | COUPLE/DECOUPLE INDICATOR |
|---|---|---|---|---|
| 170 | 166 | 167 | 165 | 185 |
| | | | | |
| | | | | |
| | | | | |

{ 210 (for each column)

EXPLICIT LOGGING OF NETWORK USER NODE/TARGET NODE COUPLING

BACKGROUND

A modern network can employ a number of different types of devices, such as routers, http-proxies, SOCKS/firewalls, DNS servers, etc., and various transmission paths between these network devices to couple various end nodes together. The ability to obtain a comprehensive list of end nodes to which a particular user was connected is becoming more and more important because of terrorism concerns, law-enforcement concerns, and concerns by companies that their standards of business conduct not be violated. Network infrastructure devices, such as those mentioned above, usually have the ability to log the nearest nodes to which transmissions that traverse them are coupled. However, the logs from numerous of these devices must be combined to obtain a comprehensive listing of the end-nodes to which any particular user had been connected since each individual device's log only provides a portion of the needed information.

Various software products are available which can be used to attempt to reconstruct a list of end nodes to which a particular user was connected. However, a given log-combining software product often only works for a subset of a particular vendors' devices, and even then an updated version of the software/firmware for a device can sometimes defeat the combining algorithm of the log-combining software. The connection list reconstruction is made all the more complicated as the connection between a user and another node can be made via a number of different paths in the network.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

As shown in the drawings for purposes of illustration, novel techniques are disclosed herein for the explicit logging in a single location of target nodes and a user node to which those target nodes are coupled. Previously the logs from numerous network devices have had to be combined in order to obtain a comprehensive listing of the target nodes to which any particular user node had been connected.

In the following detailed description and in the several figures of the drawings, like elements are identified with like reference numerals.

Figure 1:
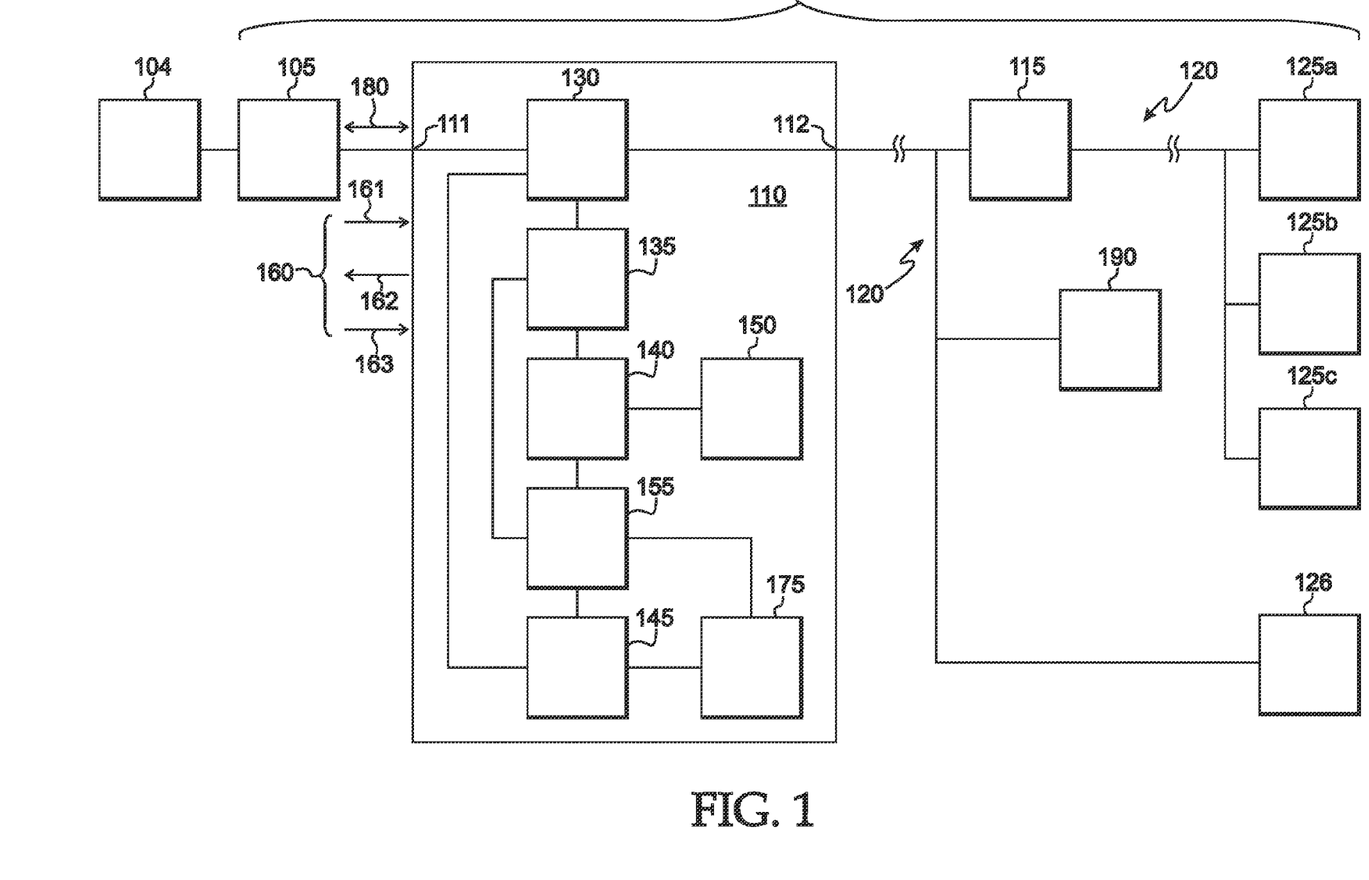
FIG. 1 is a block diagram of a network as described in various representative embodiments.

FIG. 1 is a block diagram of a network 100 as described in various representative embodiments. In FIG. 1, the network 100 comprises at a user node 105, an edge switch 110, a proxy server 115, a first, second, and third proxy-coupled target nodes 125a, 125b, 125c, a non-proxy-coupled target node 126, and a log server 190 which may more generally be referred to herein as a fourth module 190.

The edge switch 110 comprises a forwarding module 130, a target determination module 135 which may also be referred to herein as a first module 135, a logging module 140 which may also be referred to herein as a second module 140, a transfer module 145 which may also be referred to herein as a third module 145, a clock 150, a log 155, and a clean-up module 175 which may also be more generally referred to herein as a fifth module 175. For ease and clarity of illustration, other components which may be found in the edge switch 110 have not been shown in FIG. 1 or in any of the other figures.

The user node 105 is shown coupled to the network 100 and is, thereby, a part of it. The user node 105 couples to the edge switch 110 via a first port 111 on the edge switch 110. The edge switch 110 is preferably the first network device to which the user node 105 couples to in the network 100. A user 104 couples to the user node 105 enabling the user 104 to transmit signals to and/or receive signals from the network 100 via the user node 105 which could be a personal computer or other appropriate device. At a second port 112 on the edge switch 110, the edge switch 110 is further coupled to the proxy server 115, the non-proxy-coupled target node 126, and the log server 190 via one or more of the transmission paths 120 within the network 100. The proxy server 115 in turn is coupled via one or more alternative transmission paths 120 within the network 100 to at least one proxy-coupled target node 125 which is shown in FIG. 1 as a first proxy-coupled target node 125a with additional second proxy-coupled target node 125b and additional third proxy-coupled target node 125c. In a representative embodiment, the additional second proxy-coupled target node 125b and the additional third second proxy-coupled target node 125c could be coupled to the user node 105 in response to the coupling of the first proxy-coupled target node 125a to the user node 105. As an example, coupling to a particular web site using the http protocol could initiate the simultaneous coupling of other web sites (pages) resulting in a screen displayed on the user node 105 which is a composite of information from the multiple proxy-coupled target nodes 125a, 125b, 125c.

The forwarding module 130 is coupled to the first port 111, to the second port 112, to the target determination module 135, and to the transfer module 145. The target determination module 135 is coupled to the logging module 140 and to the log 155. The logging module 140 is further coupled to the log 155 and to the clock 150. The transfer module 145 is further coupled to the log 155 and to clean-up module 175. And, the clean-up module 175 is further coupled to the log 155.

The user node 105 requests and receives coupling to one of the proxy-coupled target nodes 125 or to one of the non-proxy-coupled target nodes 126 coupled to the network 100 by means of a coupling signal 160. Decoupling of the user node 105 from one of the proxy-coupled target nodes 125 or to one of the non-proxy-coupled target nodes 126 coupled to the network 100 is announced by means of a coupling signal 160.

The target determination module 135 is coupled directly to the log 155 since it may need to read the log 155 as a part of logging the decoupling of the user node 105 from one of the target nodes 125, 126 and as a part of combining log entries. The transfer module 145 is coupled directly to the clean-up module 175 since it needs to inform the clean-up module 175 that it successfully transmitted one or more log entries to the remotely located log server 190. Such notification informs the clean-up module 175 to proceed with the removal of log entries when such removal is needed.

Note that some target nodes, i.e., the non-proxy-coupled target nodes 126, can be coupled to the user node 105 without traversing the proxy server 115 while others, i.e., the proxy-coupled target nodes 125, traverse the proxy server 115. In the latter case, the target determination module 135 is configured to recognize that the target to which the user node 105 is coupled is not the proxy server 115 but the actual proxy-coupled target node 125 which is the final intent of the coupling. As such, the target determination module 135 will extract information from differing locations within the coupling and decoupling signals 160, 180.

The forwarding module 130 is coupled to all edge ports (e.g., the first and second ports 111, 112). For each packet received at an ingress port, it determines which of the one or more egress ports the packet will be transmitted by inspecting the contents of packet. The forwarding module 130 may also provide a copy of the packet to other internal modules based on the contents of packet. In particular, the forwarding module 130 can be configured to copy the coupling and decoupling signals 160, 180, i.e., coupling start and stop packets, to the target determination module 135 without interrupting the flow of the signals to their destinations. The user node 105 requests and receives coupling to one of the proxy-coupled target nodes 125 or to one of the non-proxy-coupled target nodes 126 coupled to the network 100 by means of the coupling signal 160. Decoupling of the user node 105 from one of the proxy-coupled target nodes 125 or to one of the non-proxy-coupled target nodes 126 coupled to the network 100 is announced by means of the coupling signal 160.

Preferably the edge switch 110 is the first switch that signals (i.e., packets) from the user node 105 traverse. However, other components may intervene between the user node 105 and the edge switch 110. In general, the proxy server 115 is not directly coupled to the edge switch 110 or to the proxy-coupled target nodes 125. Nor, in general is the user node 105 directly coupled to the non-proxy-coupled target nodes 126. Also, while not explicitly shown in FIG. 1, multiple users 104 may be coupled to the same user node 105, and multiple user nodes 105 may be coupled to the same edge switch 110.

Figure 2A:
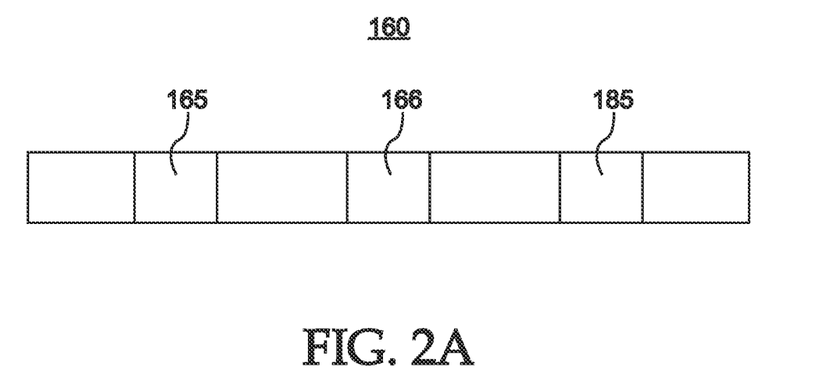
FIG. 2A is a drawing of a coupling signal as shown in FIG. 1.

FIG. 2A is a drawing of a coupling signal 160 as shown in FIG. 1. Among other data, the coupling signal 160 of FIG. 2A comprises a user node identification 166 which is the identification of the user node 105, a target identification 165 which is either the identification of a proxy-coupled target node 125 coupled to the user node 105 or either the identification of a non-proxy-coupled target node 126 coupled to the user node 105, and an optional couple/decouple indicator 185 set to indicate that coupling of the proxy-coupled target node 125 or the non-proxy-coupled target node 126 to the user node 105 has occurred.

Figure 2B:
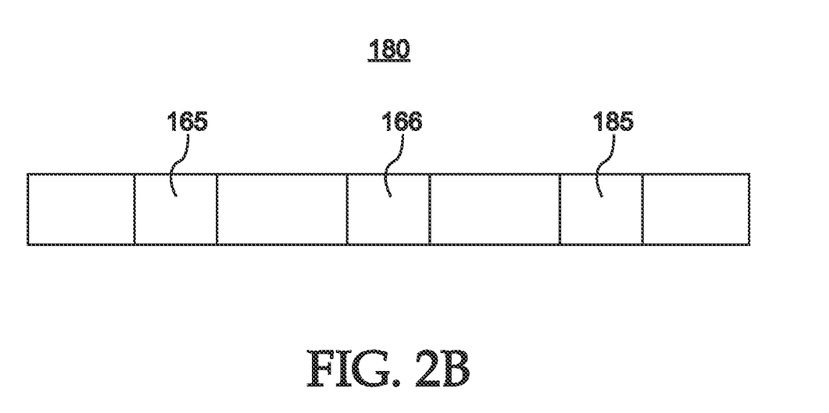
FIG. 2B is a drawing of a decoupling signal as shown in FIG. 1.

FIG. 2B is a drawing of a decoupling signal 180 as shown in FIG. 1. Among other data, the decoupling signal 180 of FIG. 2B comprises a user node identification 166 which is the identification of a user node 105, a target identification 165 which is the identification, as appropriate, of a proxy-coupled target node 125 or a non-proxy-coupled target node 126 that is decoupled from the user node 105, and an optional couple/decouple indicator 185 set to indicate that decoupling, as appropriate, of the proxy-coupled target node 125 or the non-proxy-coupled target node 126 from the user node 105 has occurred.

Figure 2C:
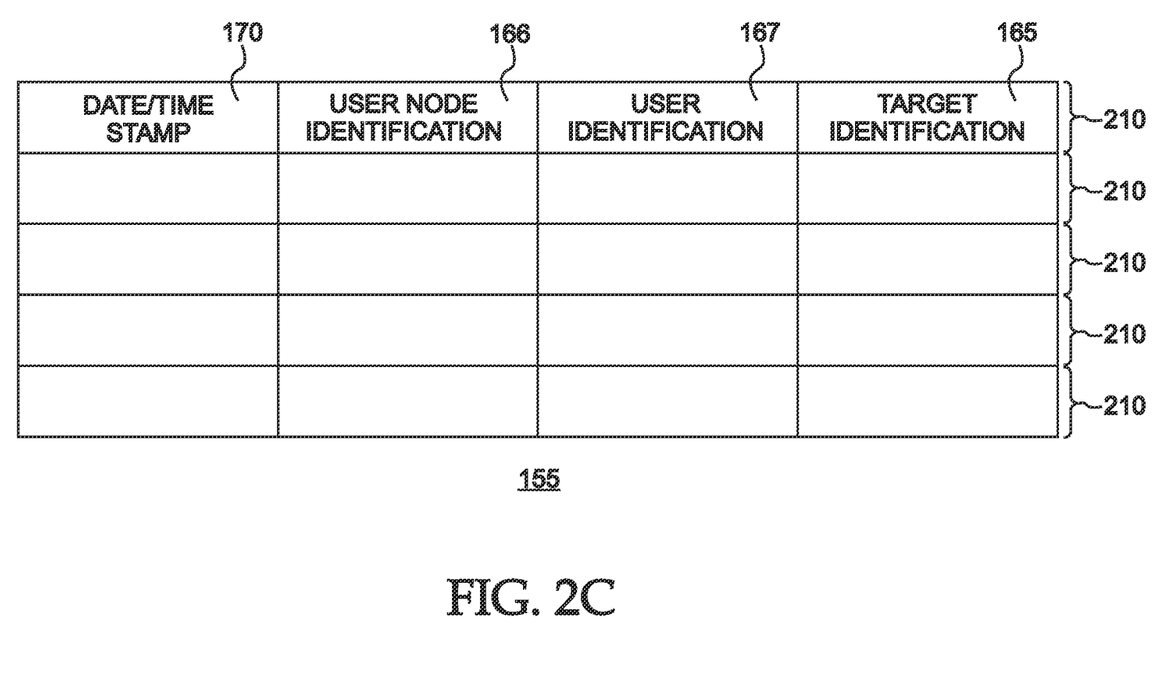
FIG. 2C is a drawing of a log as shown in FIG. 1 to store user node and, as appropriate, proxy-coupled target node or non-proxy-coupled target node coupling information.

FIG. 2C is a drawing of the log 155 as shown in FIG. 1 to store user node 105 and, as appropriate, proxy-coupled target node 125 or non-proxy-coupled target node 126 coupling information. In FIG. 2C, an entry 210 comprises an associated combination of a date/time stamp 170, a user node identification 166, a user identification 167, and a target identification 165. The user node identification 166 identifies the user node 105, and the user identification 167 identifies the user 104. The target identification 165 identifies, as appropriate, either the proxy-coupled target node 125 or the non-proxy-coupled target node 126 to which the user node 105 is coupled, and the associated date/time stamp 170 identifies the time and date that such coupling occurred. The log 155 can be implemented, for example, in either volatile or non-volatile (e.g. flash) memory.

Figure 2D:
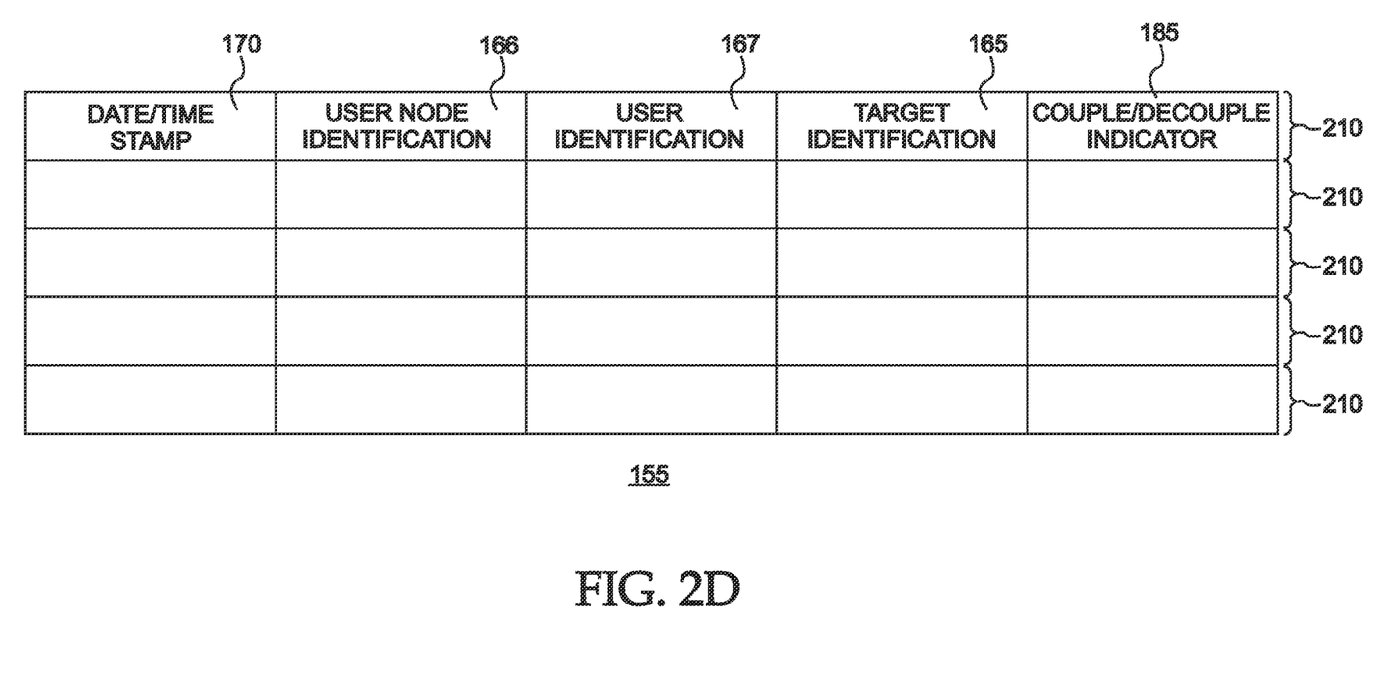
FIG. 2D is a drawing of an alternative log as shown in FIG. 1 for recording user node and, as appropriate, proxy-coupled target node and/or non-proxy-coupled target node coupling and decoupling information.

FIG. 2D is a drawing of an alternative log 155 as shown in FIG. 1 for recording user node 105 and, as appropriate, proxy-coupled target node 125 and/or non-proxy-coupled target node 126 coupling and decoupling information. In FIG. 2D, an entry 210 comprises an associated combination of a date/time stamp 170, a user node identification 166, a user identification 167, a target identification 165, and a couple/decouple indicator 185. The target identification 165 identifies, as appropriate, either the proxy-coupled target node 125 or the non-proxy-coupled target node 126 to which the user node 105 is coupled or decoupled; the associated date/time stamp 170 identifies the time and date that such coupling or decoupling occurred; and the couple/decouple indicator 185 indicates whether coupling or decoupling occurred. In this representative embodiment, the total time to which a given proxy-coupled target node 125 or a given non-proxy-coupled target node 126 was coupled to a user node 105 can be obtained by comparing the date/time stamps 170 of the coupling entry 210 and the decoupling entry 210 for, as appropriate, that proxy-coupled target node 125 or that non-proxy-coupled target node 126 and that user node 105.

In operation, the user node 105 requests and receives coupling to one of the proxy-coupled target nodes 125 or to one of the non-proxy-coupled target nodes 126 coupled to the network 100 by means of a coupling signal 160. The coupling signal 160 is transmitted over the network 100 between the user node 105 and a particular proxy-coupled target nodes 125 via the proxy server 115 when the user node 105 requests coupling to that proxy-coupled target node 125. Alternatively, the coupling signal 160 is transmitted over the network 100 directly between the user node 105 and a particular non-proxy-coupled target nodes 126 when the user node 105 requests coupling to that non-proxy-coupled target node 126. For clarity and ease of illustration, however, the coupling signal 160 is shown only between the user node 105 and the edge switch 110. Further, the coupling signal 160 may comprise several signals. In the representative embodiment of FIG. 1, the coupling signal 160 comprises a coupling request signal 161 transmitted from the user node 105 which requests that the user node 105 be coupled to a particular proxy-coupled target node 125 or alternatively to a particular non-proxy-coupled target node 126, a coupling acceptance signal 162 transmitted, as appropriate, from the proxy-coupled target node 125 or from the non-proxy target node 126 to the user node 105 which indicates acceptance, as appropriate, by the proxy-coupled target node 125 or by the non-proxy-coupled target node 126 of coupling to the user node 105, and a coupling confirmation signal 163 transmitted from the user node 105, as appropriate, to the proxy-coupled target node 125 or to the non-proxy-coupled target node 126 which indicates confirmation, as appropriate, to the proxy-coupled target node 125 or to the non-proxy-coupled target node 126 of the coupling of the user node 105 to that target node 125, 126.

Upon completion of the coupling signal 160, the target determination module 135 examines the coupling signal 160 passed to it by the forwarding module 130 to determine the target identification 165 of the proxy-coupled target node 125 or the non-proxy-coupled target node 126, as appropriate, and the user node identification 166 which comprises the identification of the user node 105. The user identification 167 can be determined by the edge switch 110 separately from previous knowledge of the pairing of the user 104 with the user node 105. The target determination module 135 then transfers that target identification 165, the user node identification 166, and the user identification 167 to the logging module 140. The logging module 140 then obtains a date/time stamp 170 from the clock 150. The date and time recorded in the date/time stamp 170 is the date and time of the coupling, as appropriate, of the proxy-coupled target node 125 or the non-proxy-coupled target node 126 to the user node 105. Various ways can be used to set and synchronize the clock 150 including setting and synchronization from a master clock attached to the network 100. The master clock is not shown in any of the figures.

At various times, entries 210 in the log 155 can be deleted from the log 155 by the clean-up module 175 according to rules preselected for that purpose. Also at various times, the transfer module 145 can transmit, i.e., transfer or copy, one or more entries 210, which may include the full content, of the log 155 to the forwarding module 130 for subsequent transmission to another location. This transmission can be effected by, for example, the log server 190, at preselected time(s) to preselected location(s), upon command at specified time(s) and to specified location(s), or by other appropriate mechanism.

Decoupling of the user node 105 and the proxy-coupled target node 125 can be indicated by the decoupling signal 180 shown in FIG. 1. In an optional implementation, upon completion of the decoupling signal 180, the target determination module 135 examines the decoupling signal 180 to determine the target identification 165 of, as appropriate, the proxy-coupled target node 125 or the non-proxy-coupled target node 126 and the user node identification 166 of the user node 105. The user identification 167 can be determined by the edge switch 110 separately from previous knowledge of the pairing of the user 104 with the user node 105. The target determination module 135 then transfers the target identification 165, the user identification 167, and the user node identification 166 to the logging module 140. The logging module 140 then obtains a date/time stamp 170 from the clock 150. The date and time recorded in the date/time stamp 170 is the date and time of the decoupling, as appropriate, of the proxy-coupled target node 125 or the non-proxy-coupled target node 126 to the user node 105. A couple/decouple indicator 185 is also passed to the logging module 140 for representative embodiments that record both the coupling and the decoupling of a user node 105 to and from a proxy-coupled target node 125. The logging module 140 then combines the target identification 165, the user identification 167, and the user node identification 166 with the date/time stamp 170 and the couple/decouple indicator 185. The date/time stamp 170 is obtained from the clock 150 wherein the date and time recorded in the date/time stamp 170 in this case is the date and time of the decoupling, as appropriate, of the proxy-coupled target node 125 or the non-proxy-coupled target node 126 from the user node 105.

Figure 3:
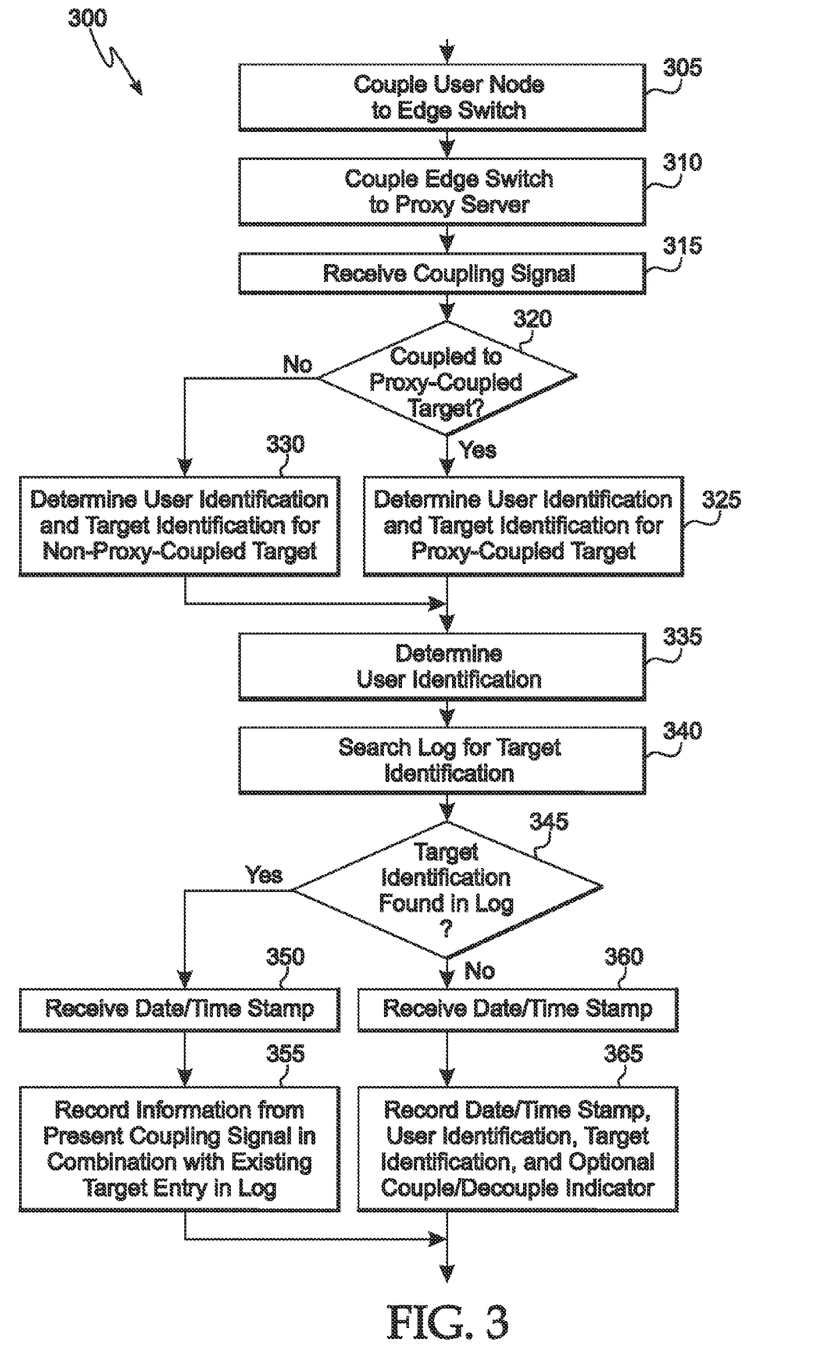
FIG. 3 is a flow chart of a method for identifying a coupling, as appropriate, of a proxy-coupled target node or a non-proxy-coupled target node to a user node and recording that information in a log as described in various representative embodiments.

FIG. 3 is a flow chart of a method 300 for identifying a coupling, as appropriate, of a proxy-coupled target node 125 or a non-proxy-coupled target node 126 to a user node 105 and recording that information in a log 155 as described in various representative embodiments. In block 305, a user node 105 is coupled to an edge switch 110 in a network 100 wherein the edge switch 110 has knowledge of the user node identification 166 and optionally of the user identification 167. Block 305 then transfers control to block 310.

In block 310, the edge switch 110 is coupled to a proxy server 115. Block 310 then transfers control to block 315.

In block 315, the forwarding module 130 of the edge switch 110 receives a coupling signal 160 which could be the coupling confirmation signal 163. Block 315 then transfers control to block 320.

If the user node 105 is coupled to a proxy-coupled target node 125, block 320 transfers control to block 325. Otherwise, block 320 transfers control to block 330.

In block 325, the user node identification 166 of the user node 105 and the target identification 165 of the proxy-coupled target node 125 coupled to the user node 105 are derived from the appropriate part of the coupling signal 160 which could be the coupling confirmation signal 163. Block 325 then transfers control to block 335.

In block 330, the user node identification 166 of the user node 105 and the target identification 165 of the non-proxy-coupled target node 126 coupled to the user node 105 are derived from the appropriate part of the coupling signal 160 which could be the coupling confirmation signal 163. Block 330 then transfers control to block 335.

In block 335, the user identification 167 of the user 104 are obtained from known paring of the user 104 and the user node 105. Block 335 then transfers control to block 340.

In block 340, the log 155 is searched for previous entries 210 comprising the target identification 165, the user node identification 166, and optionally the user identification 167. Block 340 then transfers control to block 345.

If an entry 210 comprising the target identification 165, the user node identification 166, and optionally the user identification 167 is found in the log 155, block 345 transfers control to block 350. Otherwise, block 345 transfers control to block 360.

In block 350, a date/time stamp 170 is received from the clock 150. The date/time stamp 170 comprises the current date and time. Block 350 then transfers control to block 355.

In block 355, the date/time stamp 170, the user node identification 166, optionally the user identification 167 and the target identification 165 of, as appropriate, the proxy-coupled target node 125 coupled to the user node 105, and optionally a couple/decouple indicator 185 can overwrite or combine with the entry 210 found in block 340. The couple/decouple indicator 185 is typically only stored in the log 155 if information regarding the decoupling of the proxy-coupled target node 125 from the user node 105 is stored. Overwriting or combining associated previous entries 210 as just described can be used to keep the size of the log 155 smaller than it would otherwise be. Block 355 then terminates the process.

In block 360, a date/time stamp 170 is received from the clock 150. The date/time stamp 170 comprises the current date and time. Block 360 then transfers control to block 365.

In block 365, the date/time stamp 170, the user node identification 166, optionally the user identification 167 and the target identification 165 of, as appropriate, the proxy-coupled target node 125 coupled to the user node 105, and optionally a couple/decouple indicator 185 are recorded in a log 155. The couple/decouple indicator 185 is typically only stored in the log 155 if information regarding the decoupling of the proxy-coupled target node 125 from the user node 105 is stored. Block 365 then terminates the process.

Figure 4:
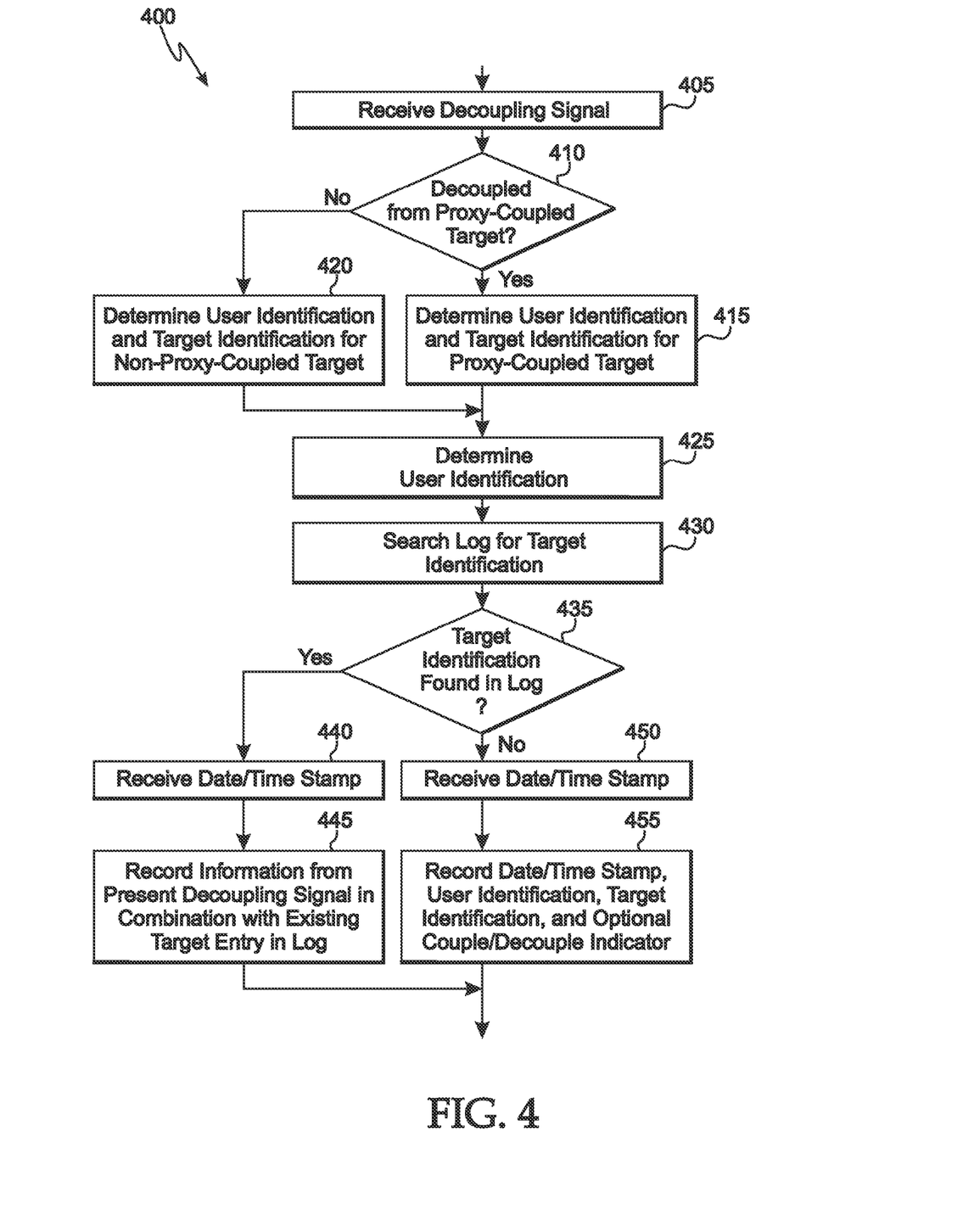
FIG. 4 is a flow chart of a method for identifying a decoupling, as appropriate, of a proxy-coupled target node or a non-proxy-coupled target node to a user node and storing that information in a log as described in various representative embodiments.

FIG. 4 is a flow chart of a method 400 for identifying a decoupling, as appropriate, of a proxy-coupled target node 125 or a non-proxy-coupled target node 126 to a user node 105 and storing that information in a log 155 as described in various representative embodiments. In block 405, the forwarding module 130 of the edge switch 110 receives a decoupling signal 180. Block 405 then transfers control to block 410.

If the user node 105 is decoupled from a proxy-coupled target node 125, block 410 transfers control to block 415. Otherwise, block 410 transfers control to block 420.

In block 415, the user node identification 166 of the user node 105 and the target identification 165 of the proxy-coupled target node 125 decoupled from the user node 105 are derived from the appropriate part of the decoupling signal 180. Block 415 then transfers control to block 425.

In block 420, the user node identification 166 of the user node 105 and the target identification 165 of the non-proxy-coupled target node 126 decoupled from the user node 105 are derived from the appropriate part of the decoupling signal 180. Block 420 then transfers control to block 425.

In block 425, the user identification 167 of the user 104 are obtained from known paring of the user 104 and the user node 105. Block 425 then transfers control to block 430.

In block 430, the log 155 is searched for previous entries 210 comprising the target identification 165, the user node identification 166, and optionally the user identification 167. Block 430 then transfers control to block 435.

If an entry 210 comprising the target identification 165, the user node identification 166, and optionally the user identification 167 is found in the log 155, block 435 transfers control to block 440. Otherwise, block 435 transfers control to block 450.

In block 440, a date/time stamp 170 is received from the clock 150. The date/time stamp 170 comprises the current date and time. Block 440 then transfers control to block 445.

In block 445, the date/time stamp 170, the user node identification 166, optionally the user identification 167, and the target identification 165 of the proxy-coupled target node 125 decoupled from the user node 105, and a couple/decouple indicator 185 can overwrite or combine with the entry 210 found in block 430. Overwriting or combining associated previous entries 210 as just described can be used to keep the size of the log 155 smaller than it would otherwise be. Block 445 then terminates the process.

In block 450, a date/time stamp 170 is received from the clock 150. The date/time stamp 170 comprises the current date and time. Block 450 then transfers control to block 455.

In block 455, the date/time stamp 170, the user node identification 166, optionally the user identification 167, and the target identification 165 of, as appropriate, the proxy-coupled target node 125 coupled to the user node 105, and a couple/ decouple indicator 185 are recorded in a log 155. In alternative embodiment, an error indicator can be stored. Block 455 then terminates the process.

Figure 5A:
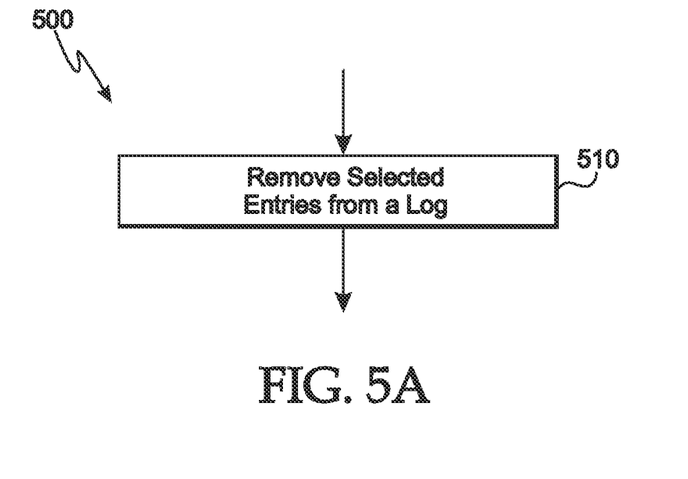
FIG. 5A is a flow chart of a method for removing selected entries from a log as described in various representative embodiments.

FIG. 5A is a flow chart of a method 500 for removing selected entries 210 from a log 155 as described in various representative embodiments. In block 510, selected entries 210 in the log 155 are removed from the log 155. The entries 210 selected could be entries 210 comprising redundant information to that found in other entries 210 or could be entries 210 that meet other appropriate criteria. Block 510 then terminates the process.

Figure 5B:
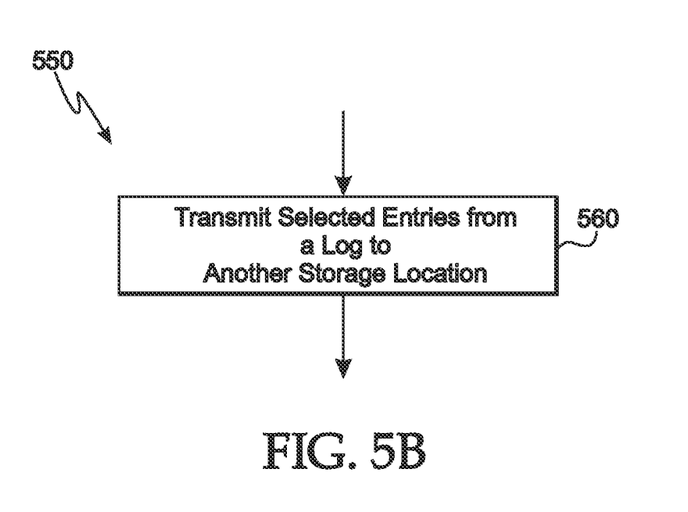
FIG. 5B is a flow chart of a method for transmitting selected entries from a log to another storage location as described in various representative embodiments.

FIG. 5B is a flow chart of a method 550 for transmitting selected entries from a log 155 to another storage location as described in various representative embodiments. In block 560, one or more selected entries 210, which may include the full content, of the log 155 are transmitted, i.e., transferred or copied to the forwarding module 130 for subsequent transmission to another location. This transmission can be effected at preselected time(s) to preselected location(s), upon command at specified time(s) and to specified location(s), or by other appropriate mechanism. The entries 210 selected could be all of the entries 210 in the log 155 or could be entries 210 that meet appropriate criteria. Block 560 then terminates the process.

As each connection, as appropriate, to a proxy-coupled target node 125 or to a non-proxy-coupled target node 126 by a user node 105 is initiated and/or terminated, entering information into the log 155 of FIG. 2C or FIG. 2D requires more of the packet to be investigated than is typical. Normally only ISO Layer 4 (TCP) header information, i.e. destination IP address or the destination port number, is logged. The location of the needed information within the packet depends upon whether or not the coupling is made via a proxy server 115 and, if so, the type of proxy server 115. As an example, when a page from an external Web site is obtained by a user node 105 that is part of a company network, the destination IP address is typically the company's http proxy server not the actual destination IP address of the Web site (the proxy-coupled target node 125). Further inspection of the payload portion of the packet, that is interpreted by the Web proxy, is needed to obtain the true destination. Even if the IP address is the actual destination, additional information may also be obtained from the packets and logged. For example, for connections to DNS servers, the name being requested might also be considered useful to enter into the log 155.

While in the representative embodiments disclosed above the user node 105 is coupled preferably first to an edge switch 110 and the log 155 resides on the edge switch 110, in other representative embodiments, the edge switch 110 could be more generally the network infrastructure device 110 to which the user node 105 is coupled.

In representative embodiments compliant with the 802.1X standard, the first network infrastructure device 110 can obtain the identity of the person using the user node 105 not merely the IP/MAC address of the user node 105.

using the user node 105 can then also be logged. Such additional information may be important in certain implementations, e.g. in healthcare, education, security, and other implementations. It can typically be obtained by another module in the edge switch 110 which is not shown in any of the drawings.

As is the case, in many data-processing products, the systems described above may be implemented as a combination of hardware and software components. Moreover, the functionality required for use of the representative embodiments may be embodied in computer-readable media (such as floppy disks, conventional hard disks, DVDs, CD-ROMs, Flash ROMs, nonvolatile ROM, and RAM) to be used in programming an information-processing apparatus (e.g., the forwarding module 130 comprising the elements shown in FIG. 1 among others) to perform in accordance with the techniques so described.

The term "program storage medium" is broadly defined herein to include any kind of computer memory such as, but not limited to, floppy disks, conventional hard disks, DVDs, CD-ROMs, Flash ROMs, nonvolatile ROM, and RAM.

In a representative embodiment, an edge switch 110 is disclosed. The edge switch 110 is in a network 100 and comprises a first module 135 configured to receive multiple coupling signals 160 from at least one user node 105, a second module 140, and a log 155. For each coupling signal 160, the coupling signal 160 indicates coupling one of the at least one user nodes 105 to one of at least one target nodes 125 via one of at least one proxy servers 115, the first module 135 is configured to determine an identity of the one of the at least one user nodes 105 and an identity of the one of the at least one target nodes 125 from the coupling signal 160, and the second module 140 is configured to record the identity of the one of the at least one user nodes 105, the identity of the one of the at least one target nodes 125, and a date and a time at which the coupling signal 160 was processed by the edge switch 110 in an entry 210 in a log 155.

In another representative embodiment, a method 300, 400 for use in a network 100 is disclosed. The method 300, 400 comprises coupling one of at least one user nodes 105 to an edge switch 110, coupling the edge switch 110 to one of at least one proxy servers 115, receiving one of at least one coupling signals 160, determining the identity of the one of the at least one user nodes 105 and the identity of the one of the at least one target nodes 125 from the coupling signal 160, receiving a date/time stamp 170, and recording an entry 210 in a log 155. The one of the at least one coupling signals 160 indicates a coupling of the one of the at least one user nodes 105 to one of the at least one target nodes 125 via the one of the at least one proxy servers 115; the date/time stamp 170 comprises date and time that the coupling signal 160 is processed by the edge switch 110; and the entry 210 comprises the identity of the one of the at least one user nodes 105, the identity of the one of the at least one target nodes 125, and the date/time stamp 170.

In yet another representative embodiment, a means for logging couplings in a network 100 is disclosed. The means for logging comprises a means for coupling one of at least one user nodes 105 to an edge switch 110, a means for coupling the edge switch 110 to one of at least one proxy servers 115, a means for receiving one of at least one coupling signals 160, a means for determining the identity of the one of the at least one user nodes 105 and the identity of the one of the at least one target nodes 125 from the coupling signal 160, a means for receiving a date/time stamp 170, and a means for recording an entry 210 in a log 155. The one of the at least one coupling signals 160 indicates a coupling of the one of the at least one user nodes 105 to one of the at least one target nodes 125 via the one of the at least one proxy servers 115; the date/time stamp 170 comprises date and time that the coupling signal 160 is processed by the edge switch 110; and the entry 210 comprises the identity of the one of the at least one user nodes 105, the identity of the one of the at least one target nodes 125, and the date/time stamp 170.

An advantage of the embodiments described herein is the ability to log and retrieve information regarding the identities of the proxy-coupled target nodes 125 to which a given user node 105 has been coupled from a single log 155. Typically numerous devices throughout a network maintain logs in which information regarding signal activities on those devices are recorded. But, to determine to which proxy-coupled target nodes 125 that a given user node 105 was coupled requires the consolidation of numerous such logs.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. An edge switch in a network, comprising:
    a first module including logic configured to receive multiple coupling signals from at least one user node;
    a second module including logic, wherein for multiple coupling signals the coupling signals indicates indicating coupling of one of the at least one user nodes to multiple, different target nodes on different network devices via one of at least one proxy servers separate from the edge switch;
    wherein, the first module is configured to;
    determine an identity of the one of the at least one user nodes and an identity of the multiple, different target nodes from the multiple coupling signals,
    recognize that the multiple, different target nodes are a final intent of coupling for the one of the at least one user nodes, and not the one of the at least one proxy servers separate from the edge switch, by extracting information from differing locations within the multiple coupling signals, and
    communicate the identity directly to a log in the edge switch;
    wherein, the second module includes logic configured to record the identity of the one of the at least one user nodes, the identity of the multiple, different target nodes on different network devices, and a date and a time at which the multiple coupling signals were processed by the edge switch in an entry in the log; and
    wherein the log is maintained in a memory on the edge switch.

2. The edge switch as recited in claim 1, wherein the second module is further configured to record in the entry an identity of a user assigned to the one of the at least one user nodes.

3. The edge switch as recited in claim 2, wherein if one of the entries in the log comprises information regarding the coupling of the user assigned to the one of the at least one user nodes to one of the multiple, different target nodes and an additional coupling signal is received indicating coupling of the user assigned to the one of the at least one user nodes to the one of the multiple, different target nodes, the second module is further configured to combine information from the additional coupling signal with the entry that comprises the information regarding the coupling of the user assigned to the one of the at least one user nodes to the one of the multiple, different target nodes.

4. The edge switch as recited in claim 1, wherein if one of the entries in the log comprises information regarding the coupling of one of the at least one user nodes to one of the multiple, different target nodes and an additional coupling signal is received indicating coupling of the one of the at least one user nodes to the one of the multiple, different target nodes, the second module is further configured to combine information from the additional coupling signal with the entry that comprises the information regarding the coupling of the one of the at least one user nodes to the one of the multiple, different target nodes.

5. The edge switch as recited in claim 1, further comprising:
a third module including logic configured to transmit at least one selected entry from the log to a separate log server.

6. The edge switch as recited in claim 1, further comprising:
a fifth module including logic configured to remove one or more selected entries from the log.

7. The edge switch as recited in claim 1, wherein the first module is further configured to receive multiple decoupling signals, wherein for each decoupling signal the decoupling signal indicates decoupling any one of the at least one user nodes from any one of the multiple, different target nodes via any one of the at least one proxy servers, the first module is further configured to determine an identity of the any one of the at least one user nodes and an identity of the any one of the multiple, different target nodes from the decoupling signal, and the second module is further configured to record the identity of the any one of the at least one user nodes, the identity of the any one of the multiple, different target nodes, and the date and the time at which the decoupling signal was processed by the edge switch in one of the entries in the log, and an indicator in the log, and wherein the indicator indicates that the entry is associated with a decoupling of the any one of the multiple, different target nodes from the any one of the at least one user nodes.

8. The edge switch as recited in claim 7, wherein the second module is further configured to record in the entry an identity of a user assigned to the any one of the at least one user nodes.

9. The edge switch as recited in claim 7, wherein if one of the entries in the log comprises information regarding the coupling or decoupling of a given one of the at least one user nodes to or from a given one of the multiple, different target nodes and an additional coupling signal, the decoupling signal, or an additional decoupling signal is received indicating coupling or decoupling of the given one of the at least one user nodes to or from the given one of the multiple, different target nodes, the second module is further configured to combine information from the additional coupling signal, the decoupling signal, or the additional decoupling signal with the entry that comprises the information regarding the coupling or decoupling of the given one of the at least one user nodes to or from the given one of the multiple, different target nodes.

10. The edge switch as recited in claim 1, further comprising:
a forwarding module including logic configured to transfer each coupling signal and/or each decoupling signal to the first module.

11. The edge switch as recited in claim 1, wherein coupling the one of at least one user nodes to the one of the multiple, different target nodes via the one of the at least one proxy servers enables simultaneously coupling the one of the at least one user nodes to other target nodes on different network devices via the one of the at least one proxy servers.

12. A method for use in a network, comprising:
coupling one of at least one user nodes to an edge switch;
coupling the edge switch to one of at least one proxy servers;
receiving multiple coupling signals, wherein the multiple coupling signals indicates a coupling of the one of the at least one user nodes to multiple, different target nodes on different network devices via the one of the at least one proxy servers;
determining the identity of the one of the at least one user nodes and the identity of the multiple, different target nodes from the multiple coupling signals;
receiving a date/time stamp, wherein the date/time stamp comprises date and time that the multiple coupling signals are processed by the edge switch; and
recording an entry in a log, wherein the entry comprises the identity of the one of the at least one user nodes, the identity of the multiple, different target nodes, and the date/time stamp, wherein the log is maintained in a location on the edge switch.

13. The method as recited in claim 12, further comprising:
recording in the entry an identity of a user assigned to the one of the at least one user nodes.

14. The method as recited in claim 13, further comprising:
if one of the entries in the log comprises information regarding the coupling of the user assigned to the one of the at least one user nodes to one of the multiple, different target nodes and an additional coupling signal is received indicating coupling of the user assigned to the one of the at least one user nodes to the one of the multiple, different target nodes, combining information from the additional coupling signal with the entry that comprises the information regarding the coupling of the user assigned to the one of the at least one user nodes to the one of the multiple, different target nodes.

15. The method as recited in claim 12, further comprising:
if one of the entries in the log comprises information regarding the coupling of one of the at least one user nodes to one of the multiple, different target nodes and an additional coupling signal is received indicating coupling of the one of the at least one user nodes to the one of the multiple, different target nodes, combining information from the additional coupling signal with the entry that comprises the information regarding the coupling of the one of the at least one user nodes to the one of the multiple, different target nodes.

16. The method as recited in claim 12, further comprising:
transmitting at least one selected entry from the log to a separate log server.

17. The method as recited in claim 12, further comprising:
removing one or more selected entries from the log.

18. The method as recited in claim 12, further comprising:
receiving a decoupling signal, wherein the decoupling signal indicates decoupling any one of the at least one user nodes from any one of the multiple, different target nodes via any one of the at least one proxy servers;
determining an identity of the any one of the at least one user nodes and an identity of the any one of the multiple, different target nodes from the decoupling signal; and
recording the identity of the any one of the at least one user nodes, the identity of the any one of the multiple, different target nodes, and the date and the time at which the decoupling signal was processed by the edge switch in one of the entries in the log, and an indicator in the log, wherein the indicator indicates that the entry is associated with the decoupling of the any one of the multiple, different target nodes from the any one of the at least one user nodes.

19. The method as recited in claim 18, further comprising:
recording in the entry an identity of a user assigned to the one of the at least one user nodes.

20. The method as recited in claim 18, further comprising:
if one of the entries in the log comprises information regarding the coupling or decoupling of a given one of the at least one user nodes to or from a given one of the multiple, different target nodes and an additional coupling signal, the decoupling signal, or an additional decoupling signal is received indicating coupling or decoupling of the given one of the at least one user nodes to or from the given one of the multiple, different target nodes, combining information from the additional coupling signal, the decoupling signal, or the additional decoupling signal with the entry that comprises the information regarding the coupling or decoupling of the given one of the at least one user nodes to or from the given one of the multiple, different target nodes.

21. The method as recited in claim 12, further comprising: simultaneously with coupling the one of at least one user nodes to the one of the multiple, different target nodes via the one of the at least one proxy servers, coupling the one of the at least one user nodes to other target nodes on different network devices via the one of the at least one proxy servers.

22. A network device in a network, comprising:

logic to couple one of at least one user nodes to the network device;

logic to couple the network device to one of at least one proxy servers;

logic to receive multiple coupling signals, wherein the multiple coupling signals indicates a coupling of the one of the at least one user nodes to multiple, different target nodes on different network devices via the one of the at least one proxy servers;

logic to determine the identity of the one of the at least one user nodes and the identity of the multiple, different target nodes from the multiple coupling signals;

logic to receive a date/time stamp, wherein the date/time stamp comprises date and time that the multiple coupling signals are processed by the network device; and logic to record an entry in a single log on the network device, wherein the entry comprises the identity of the one of the at least one user nodes, the identity of the multiple, different target nodes on different network devices coupled via the one of the at least one proxy servers, and the date/time stamp, wherein the log is maintained in a location on the network device.

* * * * *

UNITED STATES PATENT AND TRADEMARK OFFICE
CERTIFICATE OF CORRECTION

| | | |
|---|---|---|
| PATENT NO. | : 8,903,970 B2 | Page 1 of 1 |
| APPLICATION NO. | : 12/061222 | |
| DATED | : December 2, 2014 | |
| INVENTOR(S) | : Brian E. Krelle | |

It is certified that error appears in the above-identified patent and that said Letters Patent is hereby corrected as shown below:

In the Claims

In column 10, lines 17-18, in Claim 1, delete "signals indicates indicating" and insert -- signals indicating --, therefor.

Signed and Sealed this
Nineteenth Day of May, 2015

Michelle K. Lee
*Director of the United States Patent and Trademark Office*